Figure 1:
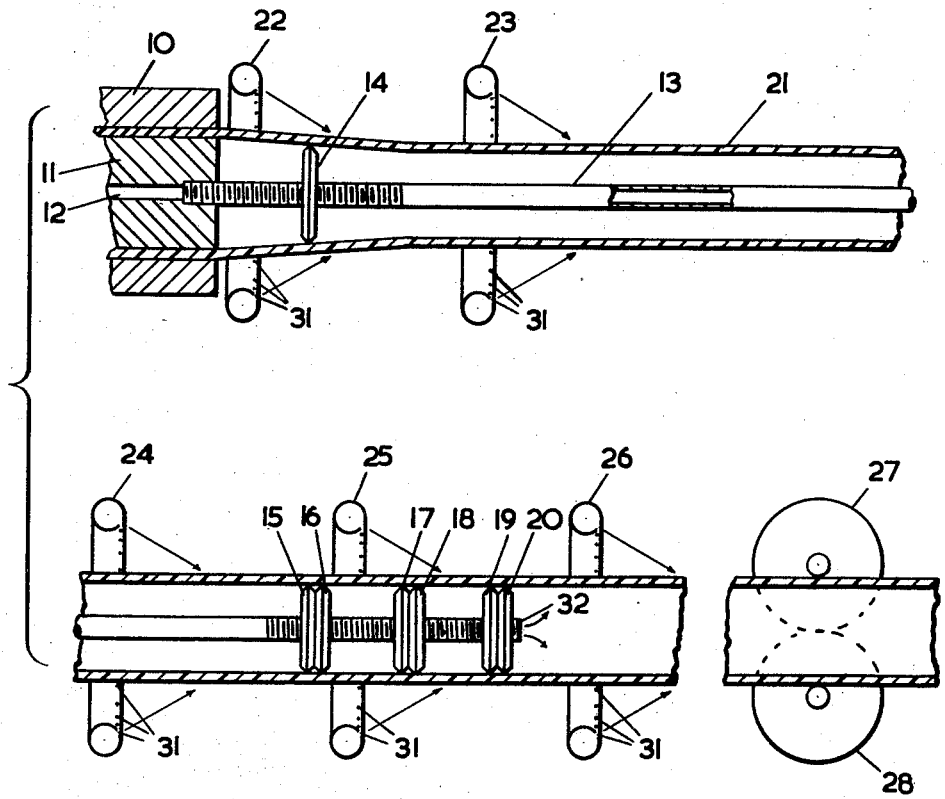

Nov. 26, 1957   J. ALLAN ET AL   2,814,071
METHOD AND APPARATUS FOR PRODUCING TUBULAR ARTICLES
Filed July 26, 1952

J. ALLAN
H. SAMUEL
INVENTORS

ATTORNEYS

United States Patent Office 2,814,071
Patented Nov. 26, 1957

2,814,071

METHOD AND APPARATUS FOR PRODUCING TUBULAR ARTICLES

John Allan and Henry Samuel, Wrexham, Wales, assignors to British Celanese Limited, a corporation of Great Britain Application July 26, 1952, Serial No. 301,088

Claims priority, application Great Britain August 9, 1951

5 Claims. (Cl. 18—14)

This invention relates to the production of tubular articles of cellulose acetate or other thermoplastic, and to apparatus for said production.

It is known to form long hollow tubes of roughly cylindrical shape by extruding a hot composition having a basis of cellulose acetate or other thermoplastic, through a die provided with a central core. Hitherto, however, it has been very difficult to obtain throughout the length of said tubes a substantially cylindrical bore of predetermined diameter. U. S. application Ser. No. 243,488, filed August 24, 1951 (L. J. Moncrieff of British Celanese Limited), now Patent 2,708,772, granted May 24, 1955, discusses some of the difficulties involved and describes a method and apparatus by means of which these can be overcome.

The prior specification referred to describes and claims a process for producing tubes of predetermined cross-sectional shape and size from thermoplastic material, wherein the material is extruded hot through an annular die, the tube so formed is caused to pass while still plastic over a mandrel comprising a shaping member for shaping the inside of the tube to the desired cross-section, carried by a stem projecting from the central core of the die, said plastic tube is kept out of contact with the stem by a cushion of gaseous medium and is cooled while in contact with the shaping member so that on passing the said member it retains the shape imparted thereby, and the cooled tube is carried forward by tractive means contacting it beyond the point where it has ceased to be plastic. Thus, along the path of the extruded tube three regions may be distinguished. In the first, extending from the die to where the tube comes into contact with the shaping member (a region in which the tube is highly plastic) relatively slow cooling occurs under little tension, and the tube tends to diminish in bore and increase in thickness. In the second region, where the tube is in contact with the shaping member, under the full tension applied by the draw-off means and with rapid cooling, the shaping occurs, the bore increases and the wall thickness diminishes. The cooling in this region must of course be distinguished from the initial cooling which is generally carried out in hot extrusion by blowing air on to the extruded material from a ring of jets immediately it emerges from the die. After this initial cooling the material is still highly plastic, whereas after the strong cooling applied during shaping the tube is no longer plastic but is self-supporting. In the third region, beyond the shaping member, the tension of the draw-off means is transmitted by the relatively cold tube without substantial change in the shape of the tube.

In the prior specification referred to, the form of mandrel specifically described and illustrated comprises a hollow cylinder open at the forward end and closed at the rear end, which is dished to facilitate drawing the tube on to it, this cylinder being supported from its rear end by a coaxial cylindrical stem carried by the central core of the extrusion die. Within the stem is a passage connected by a passage in the core with an air supply and terminating in a series of holes in the stem through which air can be supplied to the annular space between the stem and the extruded tube to keep the tube out of contact with the stem. Holes through the dished end of the cylinder allow this air to pass from the said annular space into the cylinder, through the open end of which it escapes into the tube beyond the mandrel. The shaping surface of the cylinder is preferably truly cylindrical for part of the way forward from the dished end and then tapers slightly to the open end to allow for contraction of the extruded tube on cooling.

The present invention is concerned with an improved process for obtaining tubular articles by the general method referred to above, together with apparatus for carrying out said improved process. The shaping surface of the device described above is substantially cylindrical and has, in consequence, a large area of contact with the tube while this is being cooled. We have now found that adequate shaping and size control can be effected by an interior shaping device or devices having a plurality of shaping edges spaced along the interior of the tube each making only substantially line contact with the tube, the outside of the tube, as in the method described above, being unconfined throughout the region in which it is plastic. In this way friction between the tube and the shaping member can be much reduced so that little or no lubrication between the tube and the shaping member is required under conditions that require copious lubrication when using a substantially cylindrical shaping surface. This is an important advantage.

According, therefore, to the present invention, thermoplastic tubing is produced by a process wherein the material is extruded hot in tubular form and the cross-sectional shape and size of the extruded tube are determined by drawing it, while still plastic, across a plurality of shaping edges spaced along the interior of the tube within a region in which the tube is progressively cooled to a temperature at which it is no longer plastic, the outside of the tube being unconfined throughout said region.

In the preferred form of the invention, shaping is effected by a plurality of discs threaded on to a stem supported by the central core of the die, and the invention will be described with particular reference to this embodiment. The edges of the discs are bevelled or rounded so that each disc makes substantially line contact with the extruded tube.

Two methods of carrying out the invention may be distinguished. In both methods the tube, at a temperature at which it is no longer highly plastic but is still capable of being shaped, is drawn across the edges of a series of internal discs, the external diameters of which are substantially equal to the internal diameter which the required tube would have at the temperature of these discs. The discs of this series are arranged at such a distance, e. g. 10 to 20″ from the die-face, that the tube, under the influence of the cooling means operating along its path, will have reached the desired state of limited plasticity by the time they reach these discs. The cooling is continued beyond the last disc so that substantially no alteration in shape or size will occur after leaving the disc. The difference between the two methods lies in the method of sustaining the tube wall against collapse before it reaches these discs. In the first method this is done by providing an additional disc or discs nearer the die face and the body of air in all that region of the tube behind the foremost disc is unpressurised, i. e. it is not operatively connected with a source of air under pressure. In the second method the tube wall is sustained against collapse by supplying air under pressure to the inside of the tube between the die-face and the first disc.

The first method will now be described with reference to the accompanying drawing which shows diagrammatically a preferred form of apparatus according to the invention.

Figure 2:
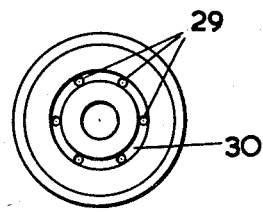

In the drawing,

Figure 1 represents in sectional elevation part of the extrusion die of a screw extruder, together with the arrangements for shaping, cooling and drawing off a tube extruded from that die; and Figure 2 shows in front elevation one of the discs forming part of the said shaping means.

The tube die 10 has a core 11 with an air passage 12 into the screw threaded forward end of which is screwed a forwardly extending screw threaded hollow mandrel stem 13. Screwed on to this stem at intervals are seven brass shaping discs 14, 15, 16, 17, 18, 19 and 20.

The drawing shows a tube 21 in the course of extrusion. Surrounding the path of the extruded tube are air cooling rings 22, 23, 24, 25 and 26. Further along the path of the extruded tube is a pair of profiled rolls 27 and 28 each of which is positively driven at the same speed and which are pressed together so as to grip the extruded tube and draw it away from the die and over the forming discs 14 to 20 at a constant rate sufficiently great to stretch the tube.

Through each disc are drilled six holes 29, to allow the free passage of air between the various zones of the extruded tube. A recess 30 milled in one face of the disc to about half its depth connects the several holes and enables air to pass through two discs in contact even when the holes of the two discs do not register.

Air rings 22 to 26 are provided with air inlet means not shown. Air outlet holes 31 are provided through which air jets are directed as shown by the arrows, on to the outer surface of the extruded tube. The air passage 12 of the extrusion die core is also connected with an air supply. The air supplied to this passage passes through the mandrel tube 13 and emerges from the open end 32 thereof as shown by the arrows. This stream of air serves to prevent over-heating of the core 11.

The size of the discs and the number and arrangement of the discs and air cooling rings along the path of the extruded tube naturally depend in any particular instance upon the nature of the material extruded and the dimensions of the extruded tube. The following directions are, however, generally applicable:

To allow for the stretching of the tube that occurs between the die and the disc 15, the external diameter of the core 11 must be greater than that of disc 15. It may, for instance, be 130 to 135% of the diameter of this disc. Similarly the internal diameter of the die 10 must be greater than the external diameter required in the tube.

The first disc 14 should be situated a short distance, (e. g. 1 to 2") beyond the cooling ring 22 so as to avoid undue sag in the tube, which at this stage is still highly plastic. The diameter of this disc is somewhat greater than the internal diameter of the finished tube but less than the external diameter of the core 11. It may, for instance be 110 to 120% the diameter of disc 20. The discs 15 to 20 should be at such a distance from the die-face that the material is no longer highly plastic when reaching the first of them, but is still capable of being shaped by the last disc under the tension applied by the draw rolls. Thus, for example, disc 15 may be at a distance between 10 and 20" from the die-face, and discs 15 and 20 may be separated by 2 to 4". The more rapid the rate of cooling of the tube the shorter may be the distance of disc 15 from the die-face. These discs 15 to 20 are all of the same diameter which is very slightly greater than the final diameter of the tube to take account of the contraction of the tube in cooling. (Alternatively, there may be a slight progressive increase in diameter from discs 5 and 16 to discs 17 and 18 or even to discs 19 and 20 to facilitate drawing the tube over the discs. The refinement is not generally necessary. Another slight modification that is useful if, as described below, rapid cooling by water is substituted for air cooling, is to reduce the last pair of discs very slightly in diameter to allow for the rapid cooling.)

Preferably the diameter of disc 14 should be such that 50 to 75% of the reduction in diameter of the tube occurs between the die-face and this disc, and the last disc 20 should be at a distance from the die-face at least ten times the distance of disc 14 therefrom. The first air-cooling ring 22 should be situated close to the die-face, preferably as close thereto as is practicable without unduly cooling the die. The position of the air-rings 23 and 24 is not very critical. They may, with advantage, be equally spaced along the distance between discs 14 and 15. The air-ring 25 should be between discs 15 and 20 and preferably, as shown, between discs 16 and 17. The air-ring 26 must be a short distance in advance of the foremost disc 20 so that cooling to a temperature at which the tube is incapable of further deformation under tension applied by the draw rolls occurs immediately after leaving this disc. For simplicity a single air ring 26 has been shown, but it is preferable to provide at least one further air ring a short distance further along the path of the material from the ring 26.

By way of example: in making tubes of external diameter 1.120" and internal diameter 1.000" from an extrusion grade of cellulose acetate moulding composition the internal diameter of the die was 1.67"; the external diameter of the core was 1.33"; the first disc 14 was of diameter 1.120" and the remaining discs, 15 to 20, situated at distances ranging from 15 to 20" from the jet face, were of diameter 1.020".

In starting the machine, the temperature at the die is controlled at a lower value than the normal extrusion temperature so that the tube emerging from the die can readily be passed over the discs and on to the draw rolls. The temperature is then raised to its normal value and extrusion continues. Air is supplied at atmospheric temperature and under a pressure of 3 to 5 lbs. per square inch to the internal air passage 12 of the core and to the various cooling rings.

The apparatus for carrying out the second method is generally similar to that shown in the drawing but with the following differences:

The disc 44 is absent. The mandrel stem 13 is closed at its forward end but has a number of radial ports connecting its interior with the space inside the tube between the die-face and what is now the first disc, viz. 15. Thus air supplied to the air passage 12 of the core 11 now emerges into this space, whence it passes in turn through the holes 29 in the discs 15 to 20. This air is supplied under sufficient pressure to prevent undue sagging of the extruded tube between the die-face and disc 15 without unduly inflating the tube. The necessity of carefully controlling this air pressure is a disadvantage of this second method compared with the first method.

It is possible, of course, to adopt a compromise between the two methods, a disc or discs of diameter intermediate between that of the core and that of the last disc being placed between the die-face and the last series of discs and the body of air between the die-face and the last disc, or between the die-face and any one of the discs, being pressurised. It is preferred, however, to avoid pressurisation and it is one of the advantages of the invention in its broadest aspect, that this is possible.

The cooling of the tube during passage over the discs has been described as effected by causing air jets from a series of air-rings spaced along the path of the tube to impinge on its outer surface. This has been found the most generally convenient method. Other fluids than air can be used, however. Thus, for example, as described in U. S. application Ser. No. 243,488, filed August 24, 1951, now said Patent 2,708,772, very rapid cooling can be achieved by spraying water on to the tube. When adopting this method, where the tube first enters the cooling zone the velocity of the spray must be carefully controlled to avoid damaging the still soft tube.

As the tube progresses through the cooling zone, however, it becomes harder and less liable to be damaged even by a spray of high momentum, and so the velocity of the spray can be progressively increased along the path of the tube. A very fine spray such as is delivered by a spray gun may be used, especially at the beginning of the cooling zone. Even more effective cooling than that obtainable by a spray can be obtained by passing the plastic tube through a bath of water. A suitable arrangement comprises a bath having two holes at opposite ends, under the water level, each closed with a plug, e. g. of rubber, the plugs having circular holes through the centre of which the mandrel stem carrying the discs passes, and which are large enough to allow the tube to pass through with slight clearance. Water is continuously supplied to the bath at a rate which maintains the level, excess escaping round the tube through both holes. The cooling water may contain a wetting agent. Liquid cooling agents, especially water, are, of course, far more efficient than air or other gaseous cooling agents. With liquids, however, special care is required to avoid damaging the surface of the tube especially when a spray is used, and the use of a bath complicates the apparatus. Air cooling is therefore preferred.

Various modifications may be made in the apparatus as specifically described above. Thus, for example, the final shaping means, instead of comprising separate discs threaded on a stem may be made in one piece by milling deep peripheral grooves in a hollow substantially cylindrical member such as that described and shown in U. S. application Ser. No. 243,488, filed August 24, 1951 (Patent 2,708,772), so that the lands between the grooves afford a shaping surface making substantially line contact with the extruded tube. Such a shaping member, of course, lacks the advantage, possessed by the disc arrangement, of axial adjustability of the various narrow zones or lines of contact between the shaping surface and the tube, but once satisfactory spacing for these lines has been found (e. g. by trials carried out with discs) a suitable one-piece shaping member can easily be designed. It is not always essential for each line or narrow zone of contact to be continuous. Thus, for example, the edges of some or all of the discs may be serrated, scalloped, slotted or otherwise incomplete (provided that sufficient contact is made with the tube to shape it satisfactorily) and the air may be vented through the gaps so formed instead of through holes through the discs. When using discs having gaps in the edge, the gaps in successive discs, especially when these gaps are substantial, should not be opposite one another. A staggered relationship of the gaps is to be preferred and may be essential. It will be understood that a shaping member simulating a series of incomplete discs may be made by appropriately cutting away in part the lands on a peripherally grooved one-piece shaping member such as is described above. Instead of using bevel-edged or rounded-edged flat discs of substantial thickness (to prevent bending under the drag of the tube over them) thin dish-shaped plates having the necessary circular or part circular very narrow edge, may be used, the dishing serving to provide the necessary rigidity. Or thin discs with supporting webs may be used. A helical shaping surface may also be used. It will be understood that the description in this specification of apparatus comprising shaping discs is applicable mutatis mutandis to apparatus in which the shaping edges are the edges of members other than discs, such as are referred to above.

The discs have been described above as made of brass. Other materials can, of course, be used. There is considerable friction between the tube and the shaping surface and to reduce this the discs or other shaping members may be made of a material such, for example, as polytetrafluorethylene, to which the thermoplastic material does not readily stick when hot, and between which and the cold thermoplastic material the coefficient of friction is small. When the discs or their equivalent are made of material adapted to reduce the drag between the tube and the shaping surface, this surface may offer a somewhat larger area of contact to the tube than when the shaping surface is of metal. It is an essential feature of the invention, however, that the shaping surface should not be continuous along that part of the path of the tube between its first and last contacts with said surface. The shaping surface must comprise a plurality of bands (complete or incomplete) spaced apart along the path of the tube where it is being strongly cooled and preferably very narrow (e. g. from 0.01" or less to 0.05" in width). The shaping surface may be highly polished, e. g. a brass surface may be chromium plated and polished, but we have so far obtained the best results with a slightly rough shaping surface. The surface may be roughened, for instance, by etching or by sand blasting. By using the apparatus of the invention as described above, we have obtained good quality tubes without using any lubricant. This is an important advantage of the invention, particularly since the absence of lubricant facilitates the reuse of scrap. If desired, however, a lubricant can be applied, for instance to reduce wear on the shaping surfaces when a pigmented thermoplastic composition is being extruded. The lubricant, e. g. a vegetable oil, mineral oil, a silicone lubricant or a suitable plasticiser (one that does not make the tube sticky or mar its surface under the conditions of application) may be introduced with the air into the annular space between the mandrel stem and the tube. The lubricant may, for example, be atomized into the air stream, or the air may be passed through a body of the lubricant.

The invention has been described with particular reference to making tubes of circular cross-section. By appropriate modification of the outline of the discs or their equivalent, however, other cross-sectional shapes, e. g. elliptical and polygonal shapes, can be obtained.

It is important in setting up the apparatus to avoid undue cooling of the die face by heat transfer from it to the cooling means. Thus, for example, when a cooling bath is used this must not be too near the die face, and the stem on which the shaping discs or the like are mounted should be designed to minimise heat conduction. Thus, the stem should not be larger in cross-sectional area than is demanded by mechanical considerations, and it may with advantage be made of heat-insulating material. The distance from the die face to the first contact of the tube with the shaping surface must, however, not be so long that the tube is no longer sufficiently plastic when it reaches that surface to be shaped thereby. In general the lower the rate of cooling of the tube being made the further the final shaping-and-cooling region should be from the die face.

According to a modification of the invention as described above, the process is carried out as described but the cooling while the tube is being shaped is insufficient to render the tube leaving the shaping device non-plastic. It can therefore be stretched to some extent by the draw-off means after leaving the last shaping disc. In this way tubes can be obtained having the shape imparted by the shaping discs but having a smaller cross-sectional area. Whether this area remains constant over a long length of finished tube depends on whether the speed of draw-off and the speed of extrusion can be kept constant. For some purposes, e. g. for display purposes, tubes of circular cross-section even where this is neither uniform nor pre-determined, are of more value than tubes of the far from regular cross-section obtained by normal extrusion.

The invention has been described with particular reference to the extrusion of tubes having a basis of cellulose acetate. The process and apparatus of the invention, however, can be employed with advantage in the extrusion of tubular articles having a basis of other thermoplastics, for example other thermoplastic cellulose derivatives such as cellulose propionate, cellulose acetate-propionate, cellulose acetate-butyrate, ethyl cellulose and benzyl cellulose; solid polymers and co-polymers of ethylene; thermoplastic polyvinyl compounds, such as polystyrene, and co-polymers of vinyl chloride with a minor proportion of vinyl acetate, of vinylidene chloride with a minor proportion of vinyl chloride, and of vinyl chloride or vinylidene chloride with acrylonitrile or methacrylonitrile; thermoplastic polymers of acrylic acid derivatives, for example polyethyl acrylate and polymethyl methacrylate; and thermoplastic linear condensation polymers such as the nylons, polyethylene terephthalate and poly-4-amino-1.2.4-triazoles. It will be understood that to obtain the desired predetermined dimensions in the tubes obtained the thermoplastic material should be substantially rigid at ordinary atmospheric temperature so that before leaving the shaping member it can be cooled to a temperature at which its dimensions do not change under the stress applied by the draw-off means. Cellulose esters derived from carboxylic acids containing 2 to 4 carbon atoms, and especially cellulose acetate, are particularly suitable.

Having described our invention what we desire to secure by Letters Patent is:

1. Apparatus for producing tubes from thermoplastic material comprising, in combination with a tube die, a mandrel stem adapted to be supported by the core of said die so as to project forwards into the tube being extruded, a plurality of shaping discs carried by said stem one behind the other, each disc being adapted to make substantially line contact with the inside surface of the extruded tube in the region in which it is still plastic, in a plane perpendicular to the axis of said tube, and said discs constituting the sole support for the tube within said region.

2. Apparatus for producing tubes from thermoplastic material comprising, in combination with a tube die, a mandrel stem adapted to be supported by the core of said die so as to project forwards into the tube being extruded, a plurality of perforated shaping discs carried by said stem one behind the other, each disc being adapted to make substantially line contact with the inside surface of the extruded tube in the region in which it is still plastic, in a plane perpendicular to the axis of said tube, and said discs constituting the sole support for the tube within said region.

3. Apparatus according to claim 2 comprising an arrangement such that the diameter and distance from the die of successive discs are such as to provide for a sharp reduction in the diameter of the tube between the die-face and the first disc followed by a gradual reduction from the first disc to the first of a series of discs spaced further away from the die-face, followed in turn by a run substantially without reduction in diameter from the first to the last of said series of discs.

4. In a method of producing tubing by extruding hot organic thermoplastic material in tubular form, drawing it continuously away from the extrusion point through a region in which it is progressively cooled from the plastic to the nonplastic condition, and supporting it within said region wholly from within, the feature which comprises effecting the internal support wholly by line-contact at intervals within said region.

5. In a method of producing tubing according to claim 4, the feature, which comprises causing the tube to undergo a short reduction in diameter between the extrusion point and the first of the points at which line-support is provided, followed by a gradual reduction in diameter from said first point to the first of a further series of points at which line-support is provided considerably further away from the extrusion point, followed in turn by a run substantially without reduction in diameter from the first to the last of said series.

References Cited in the file of this patent

UNITED STATES PATENTS

| | | |
|---|---|---|
| 2,284,866 | Hansson | June 2, 1942 |
| 2,423,260 | Slaughter | July 1, 1947 |
| 2,433,937 | Tornberg | Jan. 6, 1948 |
| 2,491,589 | Slaughter | Dec. 20, 1949 |
| 2,512,844 | Weber | June 27, 1950 |
| 2,708,772 | Moncrieff | May 24, 1955 |

FOREIGN PATENTS

| | | |
|---|---|---|
| 428,421 | Great Britain | May 13, 1935 |